United States Patent [19]

Hwang

[11] Patent Number: 4,706,064
[45] Date of Patent: Nov. 10, 1987

[54] BURGLAR ALARM WITH A MULTI-PHASE CIRCUIT, FAIL-SAFE CONTROL CIRCUIT, AUTOMATIC REARM CIRCUIT AND TWO-STEP DISARMING CIRCUIT

[76] Inventor: Shih-Ming Hwang, No 11, Alley 12, Lane 7, Ching-Tyan St., Taipei, Taiwan

[21] Appl. No.: 899,556

[22] Filed: Aug. 25, 1986

[51] Int. Cl.$^4$ .............................................. B60R 25/10
[52] U.S. Cl. ......................................... 340/63; 340/541
[58] Field of Search ...................... 340/541, 63, 52 D

[56] References Cited

U.S. PATENT DOCUMENTS

| | | | |
|---|---|---|---|
| 3,891,967 | 6/1975 | Betts | 340/63 |
| 3,968,474 | 7/1976 | Danahey | 340/63 |
| 4,038,635 | 7/1977 | Schotz | 340/63 |
| 4,123,745 | 10/1978 | Gurgone | 340/63 |
| 4,174,516 | 11/1979 | Cleary | 340/541 X |
| 4,539,548 | 9/1985 | Crites | 340/63 |

Primary Examiner—Stewart J. Levy
Assistant Examiner—Joseph W. Roskos
Attorney, Agent, or Firm—Lane and Aitken

[57] ABSTRACT

A burglar alarm with a multi-phase circuit, a fail-safe control circuit, an automatic rearm circuit and a two-step disarming circuit which applies a trigger circuit to trigger the alarm by sensors in sequence. The fail-safe control circuit informs the user that the alarm is in operating condition and is normal; the two-step disarming circuit permits temporary disarming and permanent disarming; and the automatic rearm circuit rearms the alarm automatically (if permanent disarming is not completed within a preset time after the temporary disarming) in order to protect a vehicle from external interference.

2 Claims, 1 Drawing Figure

BURGLAR ALARM WITH A MULTI-PHASE CIRCUIT, FAIL-SAFE CONTROL CIRCUIT, AUTOMATIC REARM CIRCUIT AND TWO-STEP DISARMING CIRCUIT

BACKGROUND OF THE INVENTION

Generally, wired or wireless burglar alarms for vehicles have the following defects:

(1) The alarm must be turned on before leaving the vehicle. However, a careless driver may leave the alarm off and thus the alarm is not operating.

(2) A function test of the alarm is not possible, so it is impossible to check the alarm for any trouble or malfunction of its circuit.

(3) It is inconvenient, since the user must leave the car as soon as possible within a delay period after turning on the alarm.

(4) A signal indicating that the alarm is not operating is usually very noisy, so the user never wants to test the alarm.

(5) Repeated triggering is not possible, and the alarm becomes useless after the first sensor is activated.

In view of the above defects, the inventor has created a burglar alarm with a multi-phase circuit, a fail-safe control circuit, an automatic rearm circuit, and a two-step disarming circuit.

The present invention has a self-testing function and the following characteristics:

(1) It automatically enters a standby mode as soon as a door, engine hood, or trunk lid is opened.

(2) It automatically enters a standby mode as soon as the last door is closed.

(3) It gives a short "CHIRP" signal after the closing of the last door or engine hood or trunk lid, as an indication that the doors have been fully closed and the alarm is in operating condition (function of the fail-safe control circuit).

(4) Its sensors can trigger the alarm sequentially, so that even after one sensor has triggered the alarm, the vehicle is still protected by the other sensors.

(5) Easy to operate, without limitation from period of delay-triggering.

(6) A wireless signal can disarm the alarm only temporarily. A further disarming procedure must be completed within a preset time before the alarm is rearm automatically. Therefore, it prevents interference from other wireless signals, so a vehicle with this alarm is protected from accidental disarming as well as from burglary.

SUMMARY OF THE INVENTION

The present invention provides a burglar alarm with a multi-phase circuit, a fail-safe control circuit, an automatic rearm circuit and a two-step disarming circuit. It uses sensors located in the doors, engine hood and trunk lip to form a plurality of interfaces so that after triggering by the first sensors, the other sensors will still be workable and can trigger the alarm sequentially for multi-phase protection. The fail-safe control circuit gives a short "CHIRP" signal as soon as the last door is closed, to indicate that the alarm is operating. The automatic rearm circuit can avoid interference and malfunction due to negligence, and rearm the alarm at the end of a present time. The two-step disarming circuit can cause temporary and permanent disarming to provide multiple protection.

DESCRIPTION OF THE PREFERRED EMBODIMENT

Figure 1:
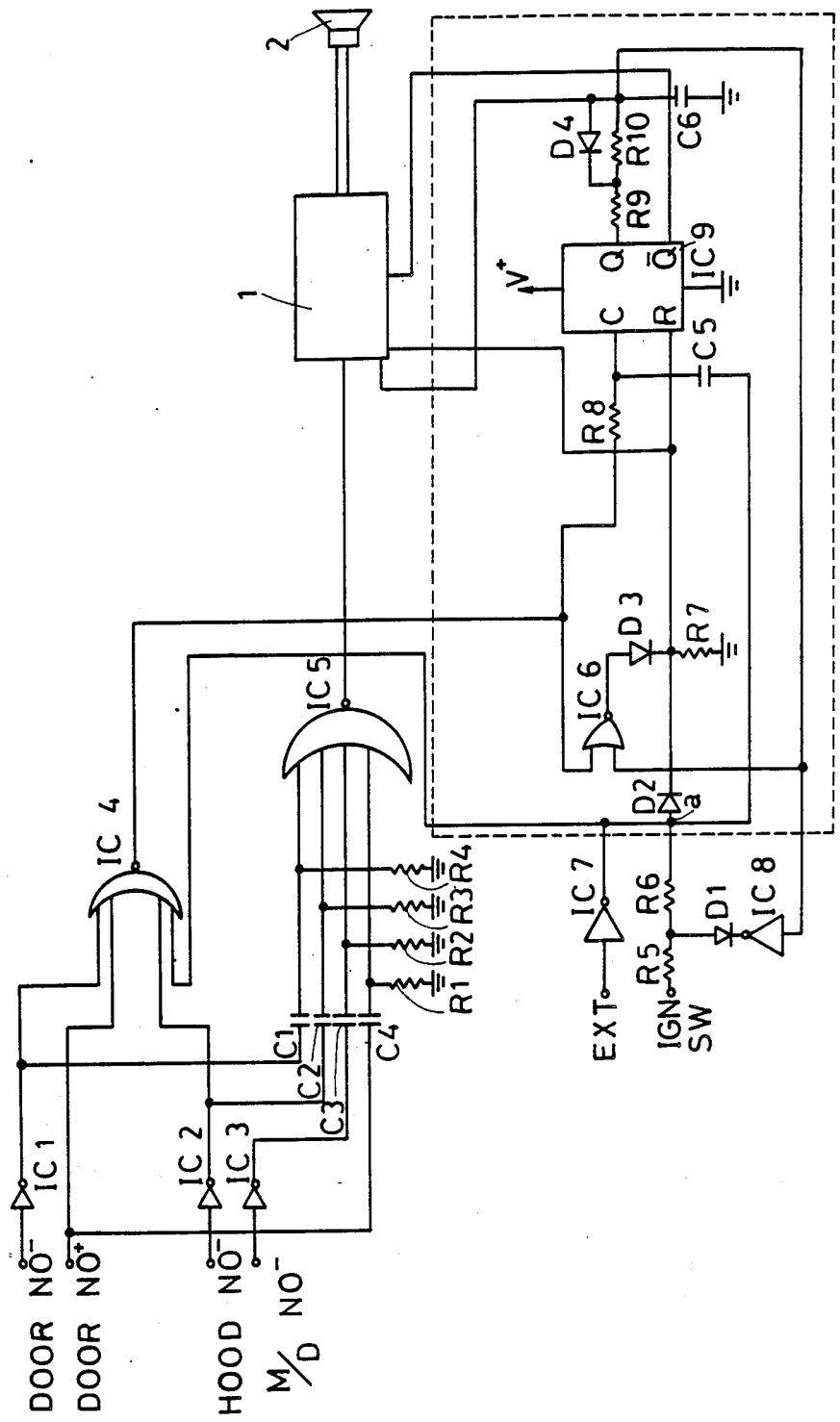
FIG. 1 is a circuit diagram of an embodiment according to the present invention.

Please refer to FIG. 1, a circuit diagram for an embodiment of the present invention. It has a trigger circuit comprising four sensors, DOOR NO$^-$, DOOR NO$^+$, HOOD NO$^-$, M/D NO$^-$, installed in the doors, engine hood and trunk lip, respectively, of a vehicle. The sensors are connected to an or-gate IC$_5$, which will apply a signal to amplifier 1 to energize speaker 2 to sound an alarm when any of the four sensors sense an opening of the vehicle doors, hood, or trunk lid while the circuit is armed. The sensors, with input to inverters IC$_4$, IC$_5$, capacitors C$_3$–C$_6$, and resistors R$_5$–R$_8$ after phase inversion, form a control circuit with four interfaces I, II, III, and IV. After the first interface is triggered by the first sensor, if the door with the first sensor is still open after a preset time (i.e., alarm has been reset automatically), contact with another sensor in the vehicle will trigger the second interface with the second sensor, and so forth. It provides a sequential control with four interfaces so that the present invention can keep on triggering continuously and other sensors can remain operative after the first sensor has triggered the alarm circuit. The said embodiment uses four interfaces for trigger control. The number of interfaces can be increased according to actual requirements.

The present invention has some switches, N.O. Input and N.C. Input, located in the engine hood, trunk lip or door. As soon as an External Key is turned ON, a phase inverter IC$_7$ gives a "Hi" output which, via diode D$_2$, resets flip-flop IC$_9$ to disarm the alarm system temporarily via a signal applied from the $\overline{Q}$ output to the amplifier 1. As soon as the External Key is reset, output from or-gate IC$_4$ changes from "Lo" to "Hi". Then, resistor via R$_8$ and C$_5$ capacitor, flip-flop IC$_9$ sets Q output as "Hi" and timing is done by resistors R$_9$, R$_{10}$ and capacitor C$_6$ so that the alarm will be armed again via a signal applied to amplifier 1 from the timing circuit of resistors R$_9$, R$_{10}$ and capacitor C$_6$ at the end of the set time if no signal has been received from switches installed in the door, engine hood or trunk lip. That is, Q output from flip-flop IC$_9$ returns to or-gate IC$_6$, inverter IC$_8$ and diode D$_1$ to cancel signal from the ignition switch, and or-gate IC$_6$ and diode D$_3$ will then latch the circuit, and restore the alarm to operating condition. In case a door or the hood is opened within the preset time, output from or-gate IC$_4$ will go "Lo", the input to or-gate IC$_6$ will be "0,0" and the output from it is "1" ("Hi") so that flip-flop IC$_9$ is reset, $\overline{Q}$ output of flip-flop IC$_9$ is "Hi", and so, the alarm is not triggered by the output from or-gate IC$_5$. When the last one of the doors, the hood or the trunk lid is closed, the output from the or-gate IC$_5$ will go to "Hi". The $\overline{Q}$ output applied to the amplifier 1 at this time will be "Lo" so that the amplifier (1), in response to the signal from the or-gate IC$_5$, triggers the speaker (2) to give a short "CHIRP" signal as an indication that the alarm system is operative and in working condition. When it is in working condition, opening of a door, hood, or trunk lid will trigger the alarm system. If the alarm system has been disarmed by a wireless device, it is impossible to change $\overline{Q}$ output of flip-flop IC$_9$ to "Hi" via the ignition switch of the engine within the preset time after opening the door. Therefore, the present invention provides multiple burglar-proof features and it is a breakthrough in the field of burglar-proof devices.

I claim:

1. A burglar alarm system for an automotive vehicle having doors and an ignition switch:

alarm means operative when armed to sound an alarm signal in response to the opening of a door of said vehicle and being inoperative to sound said alarm when disarmed, two step disarming means for temporarily disarming said alarm means in response to receiving a first external signal and for disarming said alarm means in response to said first external signal followed by the operation of the ignition switch of said vehicle within a predetermined time interval after receiving said external signal and to automatically rearm said alarm means after said predetermined interval if said ignition is not operated within said predetermined interval, said alarm means sounding a short chirp signal in response to the closure of the last door of said vehicle while said alarm means is temporarily disarmed in response to said first external signal.

2. A burglar alarm system for an automotive vehicle as recited in claim 1, wherein said automotive vehicle has a hood and a trunk lid and said alarm means is operative to sound said alarm signal when armed in response to the opening of said hood or said trunk lid, said alarm means generating said short chirp signal in response to the closure of the last one of said door hood or trunk lid while said alarm means is temporarily disarmed in response to said external signal.

* * * * *